(12) United States Patent
Liao

(10) Patent No.: US 8,596,653 B2
(45) Date of Patent: Dec. 3, 2013

(54) TWO-FOLD FOUR-WHEEL GOLF BAG CART FOLDING DEVICE

(75) Inventor: Gordon Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 0 days.

(21) Appl. No.: 13/409,322

(22) Filed: Mar. 1, 2012

(65) Prior Publication Data

US 2013/0229001 A1 Sep. 5, 2013

(51) Int. Cl.
*B62B 1/00* (2006.01)

(52) U.S. Cl.
USPC .... 280/47.26; 280/639; 280/651; 280/DIG. 6

(58) Field of Classification Search
USPC ......... 280/638, 639, 659, 651, 655, 652, 654, 280/646, 645, 62, 47.16, 47.17, 47.2, 47.21, 280/47.22, 47.27, 47.23, 47.24, 47.26 280/DIG. 6
See application file for complete search history.

(56) References Cited

U.S. PATENT DOCUMENTS

| | | | | |
|---|---|---|---|---|
| 6,698,789 | B2* | 3/2004 | Reimers et al. | 280/651 |
| 8,104,777 | B2* | 1/2012 | Liao | 280/38 |
| 8,191,920 | B2* | 6/2012 | Zhang | 280/651 |
| 2004/0195806 | A1* | 10/2004 | Reimers et al. | 280/651 |
| 2005/0046130 | A1* | 3/2005 | Cheng et al. | 280/47.26 |
| 2009/0079165 | A1* | 3/2009 | Liao | 280/646 |
| 2010/0052275 | A1* | 3/2010 | Reimers et al. | 280/47.26 |
| 2011/0215542 | A1* | 9/2011 | Wang | 280/35 |

* cited by examiner

*Primary Examiner* — John Walters
*Assistant Examiner* — Brian Swenson
(74) *Attorney, Agent, or Firm* — Alan Kamrath; Kamrath IP Lawfirm, P.A.

(57) ABSTRACT

A two-fold four-wheel golf bag cart folding device includes a lower cart frame having a connecting plate installed at an upper end of the lower cart frame and a lower supporting base disposed at a lower end of the lower cart frame. An upper cart frame includes a lower end coupled to the connecting plate and has an upper supporting base and a handle module at an upper end, such that the upper supporting base and the lower supporting base are fixed to the golf bag. A rear wheel stand is mounted on both sides of the connecting plate and has a rear wheel. A pull rod includes an end coupled to the handle module and the other end coupled to the rear wheel stand. A front wheel set has two front wheels installed on both sides of the lower supporting base respectively. A locking mechanism is installed between an upper end of the upper cart frame and a lower end of the handle module and has a function of fixing an angle between the upper cart frame and the handle module. A four-link-rod mechanism is installed among the handle module, the rear wheel stand and the pull rod. The front wheels can be closed synchronously while the rear wheels are being folded, and the four wheels touch the ground simultaneously to skip the step of folding the front wheels and removing the golf bag, preventing staining the user, but also facilitating the user to carry and move the golf bag cart and to store both the golf bag and cart altogether.

2 Claims, 19 Drawing Sheets

TWO-FOLD FOUR-WHEEL GOLF BAG CART FOLDING DEVICE

BACKGROUND OF THE INVENTION

1. Field of the Invention

The present invention relates to a two-fold four-wheel golf bag cart folding device and, in particular, to a device capable of pushing rear wheels towards front wheels to touch the ground simultaneously when a golf bag cart is folded, to skip additional steps of folding the front wheels and removing a golf bag. The invention prevents staining users and facilitates users to carry and move the golf cart, so that the golf bag and cart can be stored together to achieve the effect of a simple and convenient operation.

2. Description of the Related Art

With reference to FIGS. 1 to 3 for a conventional two-fold three-wheel golf bag cart, a handlebar of the golf bag cart can be folded downward without the need of removing a golf bag A, but the golf bag cart will fall backward. Thus, it is necessary to fold the front wheels before folding the whole golf bag cart in order to keep the cart standing. Therefore, a user has to bend or squat to fold (remove) the front wheels, not only causing complicated and inconvenient operations and poor postures, but also staining the user's body or clothes easily. Obviously, this conventional golf bag cart requires improvements.

With reference to FIGS. 4 and 5 for another conventional two-fold three-wheel golf bag cart, a handlebar of the golf bag cart can be folded downward without the need of removing a golf bag A, and the folded golf bag cart can stand without the need of folding the front wheel. However, the area of the bottom of the three-wheel golf bag cart is smaller than the four-wheel golf bag cart. Thus, the cart body may topple over easily when moving on a slope. Also, the weight of the golf bag at the front will press a lower supporting base against the ground and the golf bag cart stands after the golf bag cart is folded. As a result, the front and rear wheels cannot be used to push the golf bag cart by users. Obviously, this conventional golf bag cart also requires improvements.

SUMMARY OF THE INVENTION

Therefore, it is a primary objective of the present invention to provide a two-fold four-wheel golf bag cart folding device with a simple and convenient operation. Particularly, a golf bag cart is capable of synchronously closing in the front wheels while folding the rear wheels, and the four wheels can touch the ground simultaneously to skip the step of folding the front wheels and removing the golf bag. The invention prevents staining the user but also facilitates the user to carry and move the golf bag cart and to store both the golf bag and cart altogether.

To achieve the foregoing objective, the present invention comprises: a lower cart frame, having a connecting plate installed at an upper end of the lower cart frame and a lower supporting base disposed at a lower end of the lower cart frame; an upper cart frame, with a lower end coupled to the connecting plate and having an upper supporting base and a handle module at an upper end, with the handle module pivotally coupled to the upper supporting base such that the upper supporting base and the lower supporting base are fixed to the golf bag; a rear wheel stand mounted on both sides of the connecting plate and having a rear wheel; a pull rod having an end coupled to the handle module and the other end coupled to the rear wheel stand; a front wheel set having two front wheels installed on both sides of the lower supporting base respectively; a locking mechanism installed between an upper end of the upper cart frame and a lower end of the handle module and having a function of fixing an angle between the upper cart frame and the handle module; and a four-link-rod mechanism installed among the handle module, the rear wheel stand and the pull rod. The front wheels can be closed in synchronously while the rear wheels are being folded, and the four wheels can touch the ground simultaneously to skip the step of folding the front wheels and removing the golf bag. The invention prevents staining the user but also facilitates the user to carry and move the golf bag cart and to store both the golf bag and cart altogether.

DETAILED DESCRIPTION OF THE PREFERRED EMBODIMENTS

To make it easier to understand the technical characteristics and measures of the present invention to achieve the aforementioned objectives and effects, preferred embodiments are used with related drawings for the detailed description of the present invention.

With reference to FIGS. 6 to 10 for a golf bag cart of the present invention, the gold bag cart comes with a bilaterally symmetric cart body, and only one side of the cart is described for simplicity.

Figure 16:
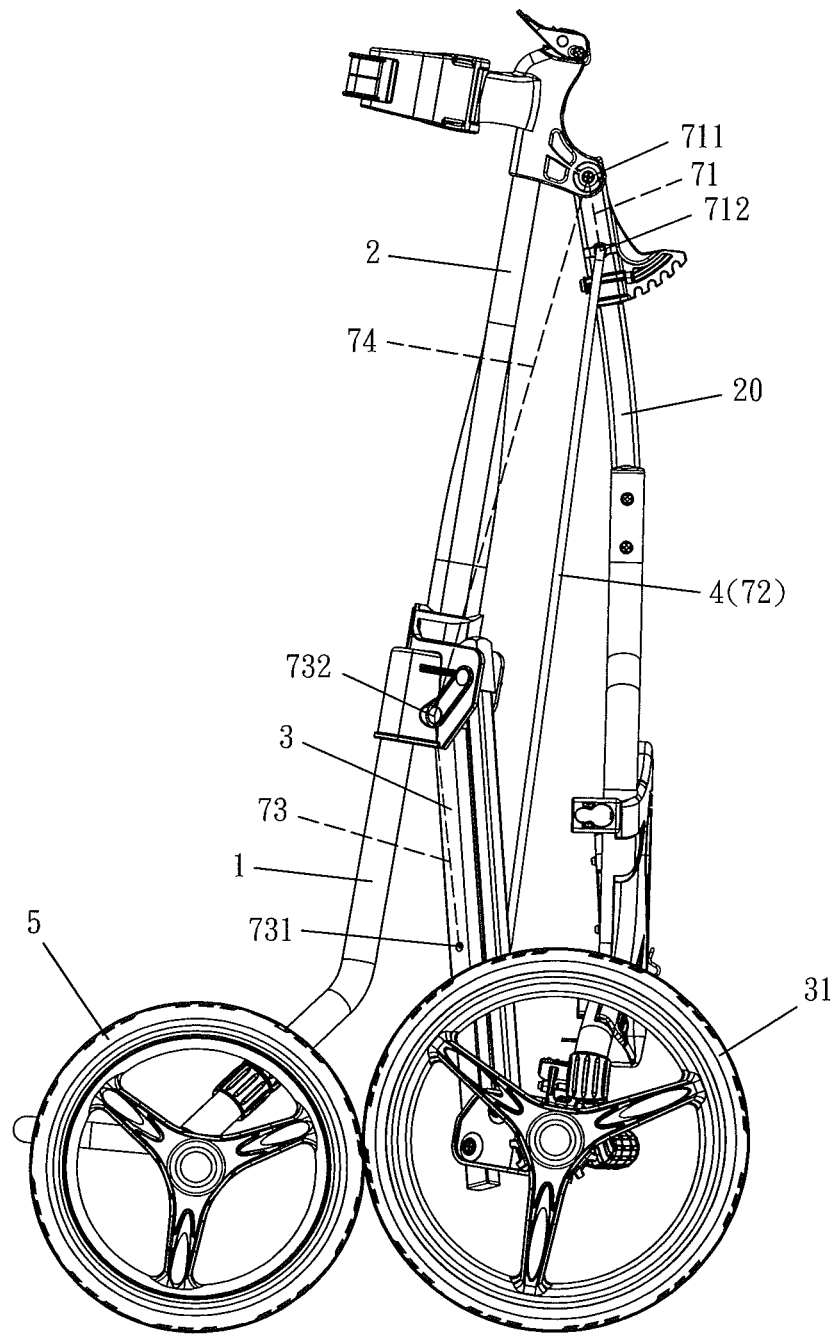
FIG. 16 is a schematic view of a four-link-rod mechanism of the present invention.

The present invention comprises a lower cart frame 1 having a connecting plate 11 installed at an upper end of the lower cart frame 1 and a lower supporting base 12 disposed at a lower end of the lower cart frame 1. An upper cart frame 2 includes a lower end coupled to the connecting plate 11 and an upper end having an upper supporting base 21 and a handle module 20. The handle module 20 is pivotally coupled to the upper supporting base 21. A rear wheel stand 3 is mounted on both sides of the connecting plate 11 and has a rear wheel 31 fixed to a rear end of the rear wheel stand 3. A pull rod 4 includes an end coupled to the handle module 20 and the other end coupled to the rear wheel stand 3 to produce a link between the handle module 20 and the rear wheel stand 3. A front wheel set has two front wheels 5 installed on both sides of the lower supporting base 12 respectively. A locking mechanism 6 is installed between the upper end of the upper cart frame 2 (or the upper supporting base 21) and the lower end of the handle module 20. The locking mechanism 6 has a snap seat 61 fixed at the lower end of the handle module 20 and having a plurality of snap slots 611. A push-pull surface 612 is disposed at the front end of the snap slot 611. A pull buckle 62 is pivotally coupled to the upper end of the upper supporting base 21. An elastic element 63, such as a torque spring, abuts against the rear end. A long slot 64 is formed at the front end for passing a snap rod 65 to latch with or separate from the snap slot 611. A four-link-rod mechanism, as shown in FIG. 16, includes a first link rod 71 extending from a first shaft 711 to a second shaft 712 under the handle module 20, a second link rod 72 being a pull rod 4, a third link rod 73 extending from a first shaft 731 to a second shaft 732 of the rear wheel stand 3, and a fourth link rod 74 extending from a first shaft 711 of the handle module 20 to a second shaft 732 of the rear wheel stand 3. With the design of the size of the four-link-rod mechanism, when the handle module 20 is turned downward and folded, the rear wheels 31 are folded synchronously to approach the front wheel 5 closely and touch the ground altogether, to achieve the effect of keeping the golf bag cart standing after the cart is folded.

Figure 17:
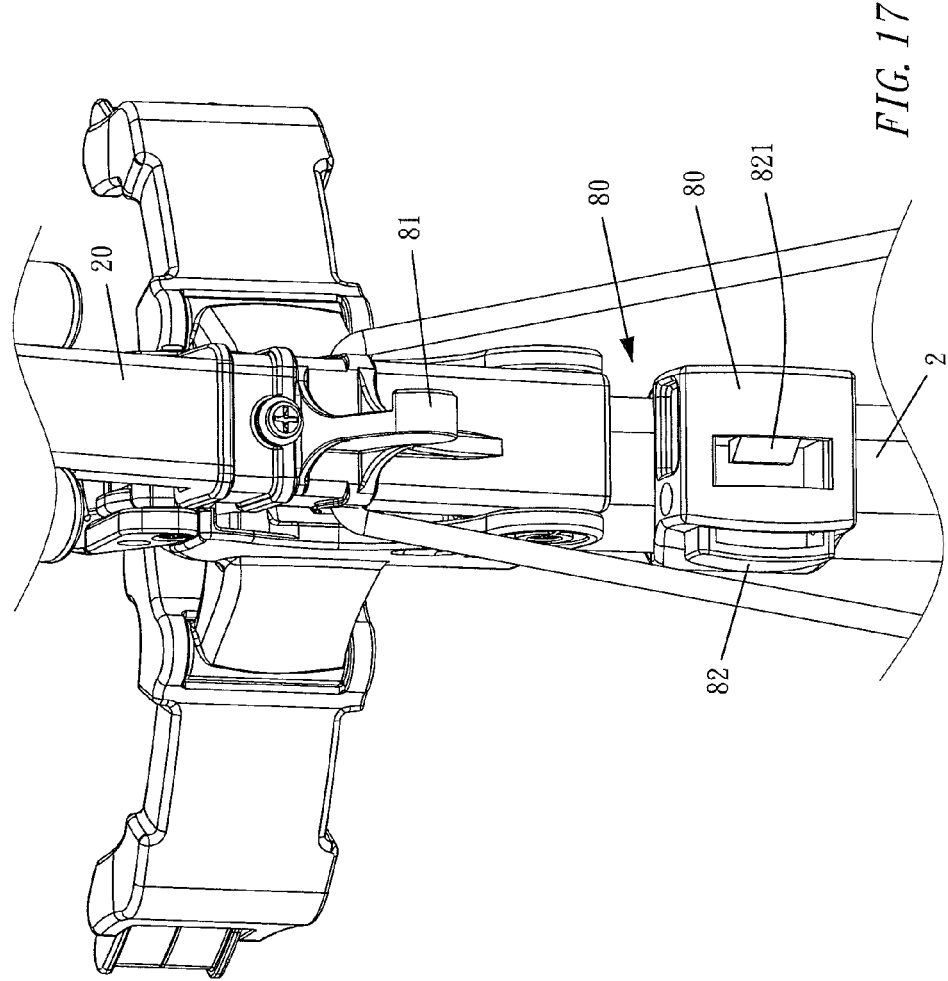
FIG. 17 is a perspective view of a folding and fixing mechanism of the present invention.
Figure 18:
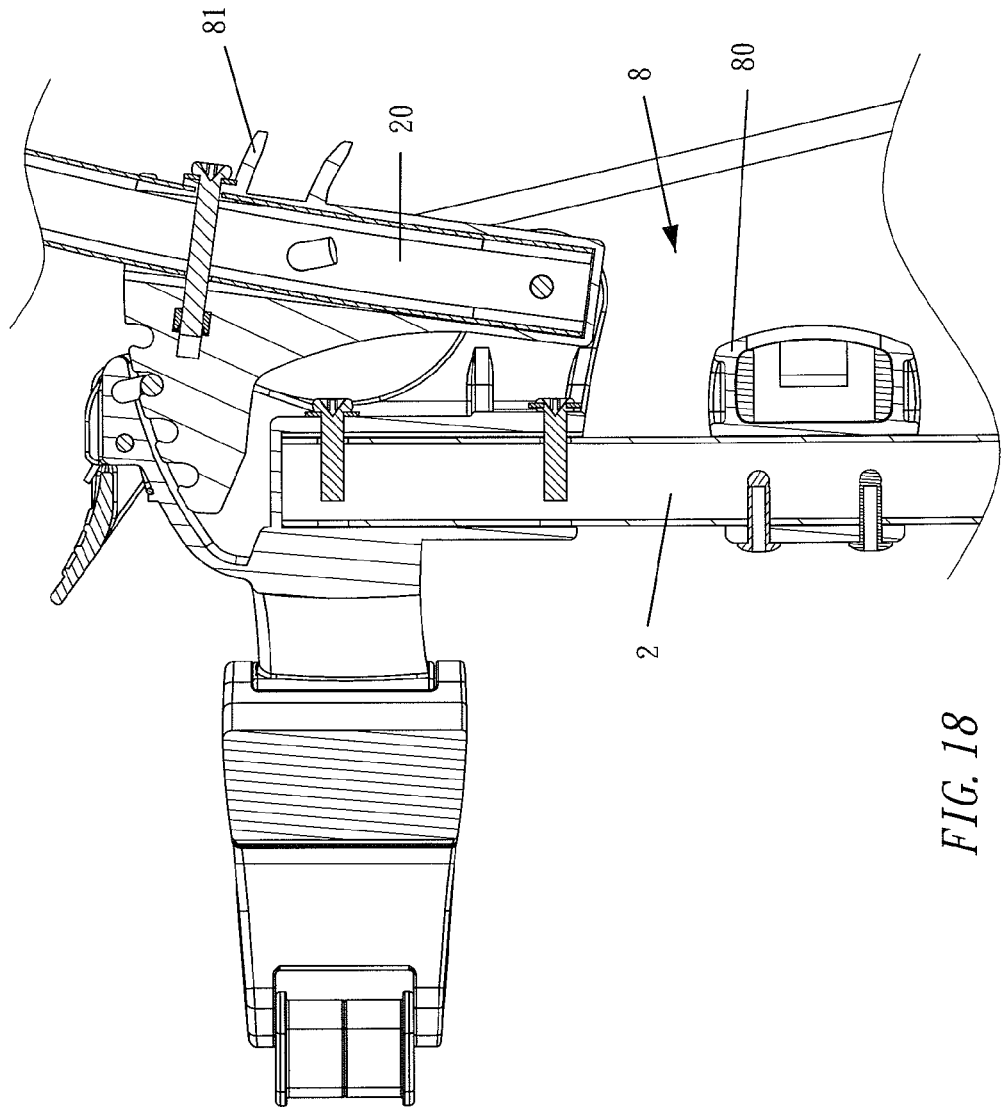
FIG. 18 is a cross-sectional view of a folding and fixing mechanism of the present invention.
Figure 19:
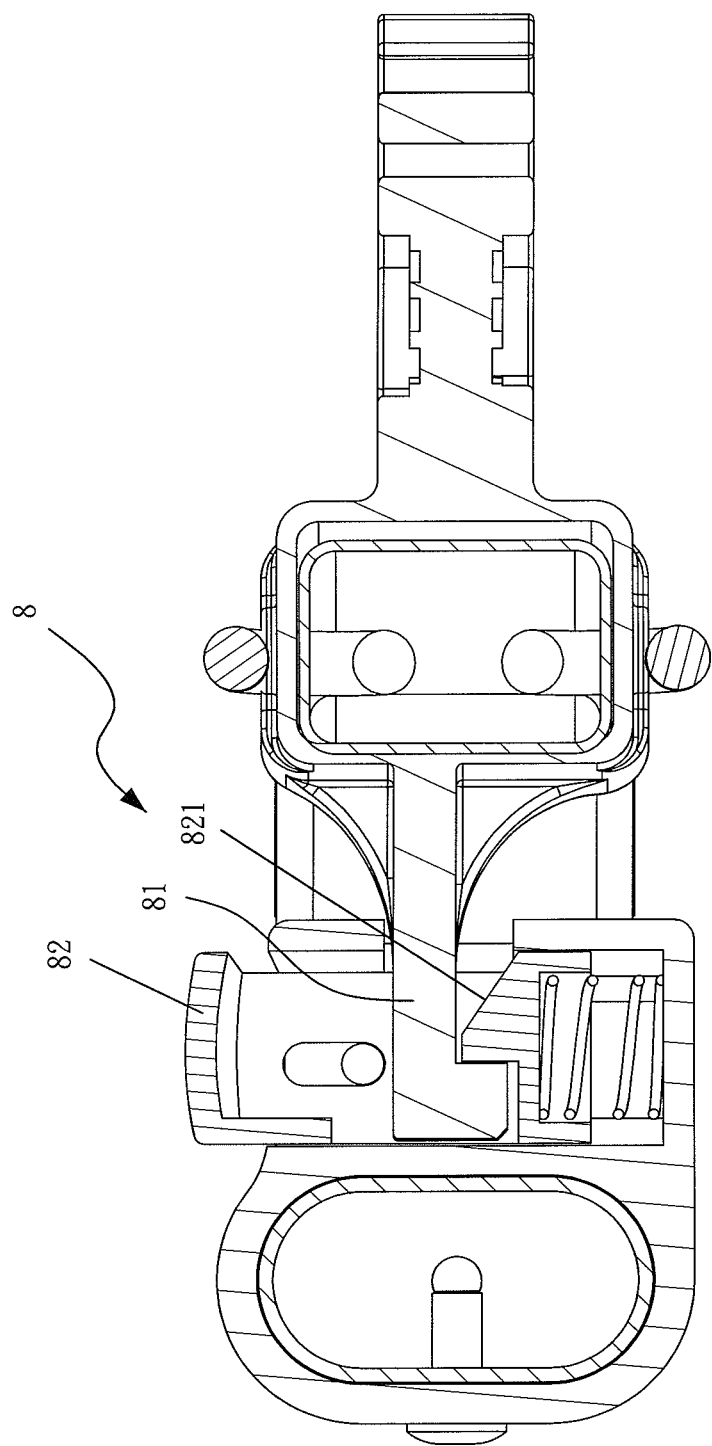
FIG. 19 is a cross-sectional view of snapping a folding and fixing mechanism of the present invention.

The present invention further comprises a folding and fixing mechanism 8 as shown in FIGS. 17 to 19. The folding and fixing mechanism 8 comprises a snap hook 81 installed at a lower end of the handle module 20 and a snap block 80 disposed at an upper end of the upper cart frame 2. The snap block 80 contains an elastic press button 82 installed therein, and the push button 82 further has an oblique surface 821 disposed opposite to an external side of the snap block 80 for snapping in the snap hook 81.

Figure 1:
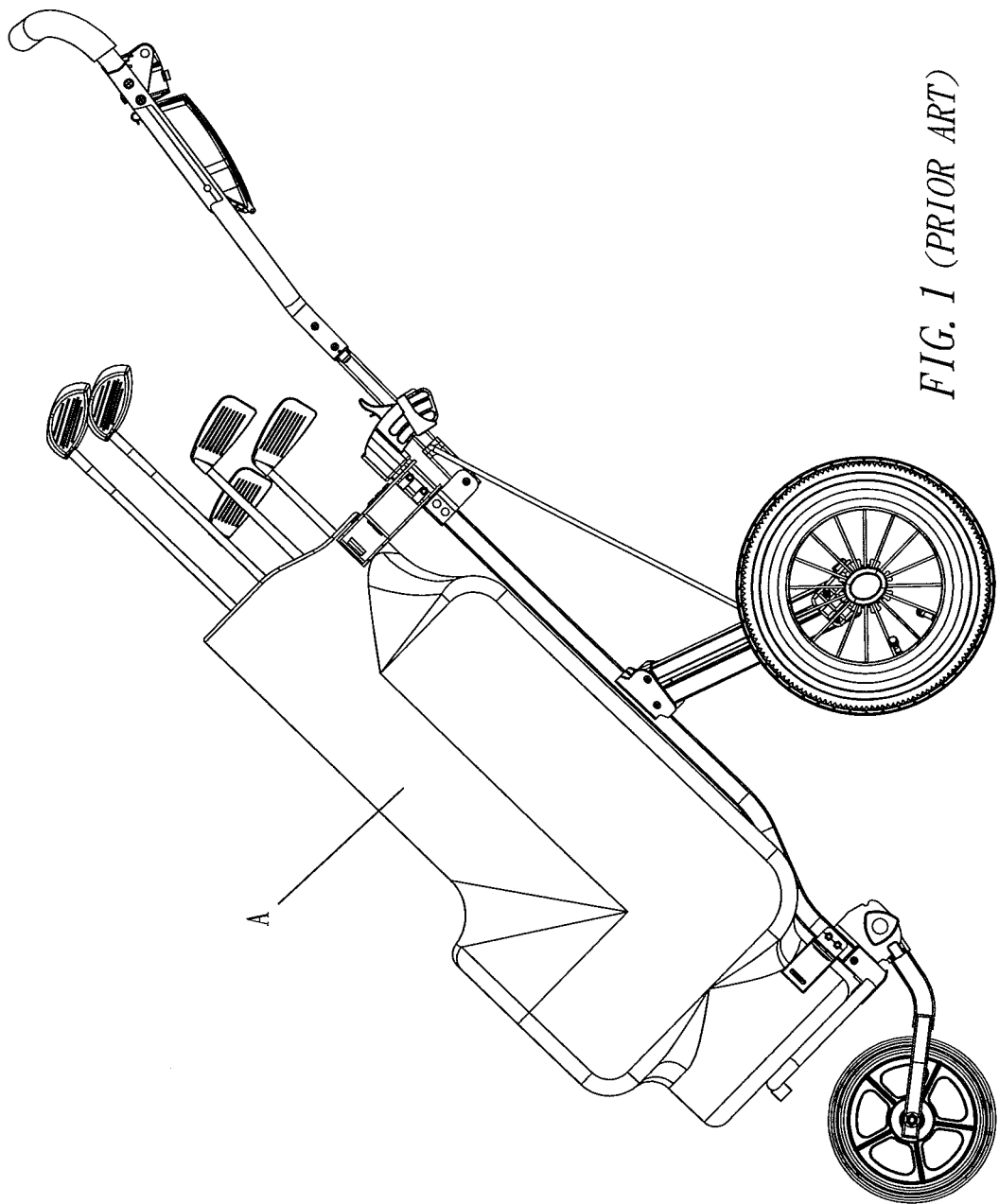
FIG. 1 is a side view of a first conventional golf bag cart when the cart is unfolded.
Figure 2:
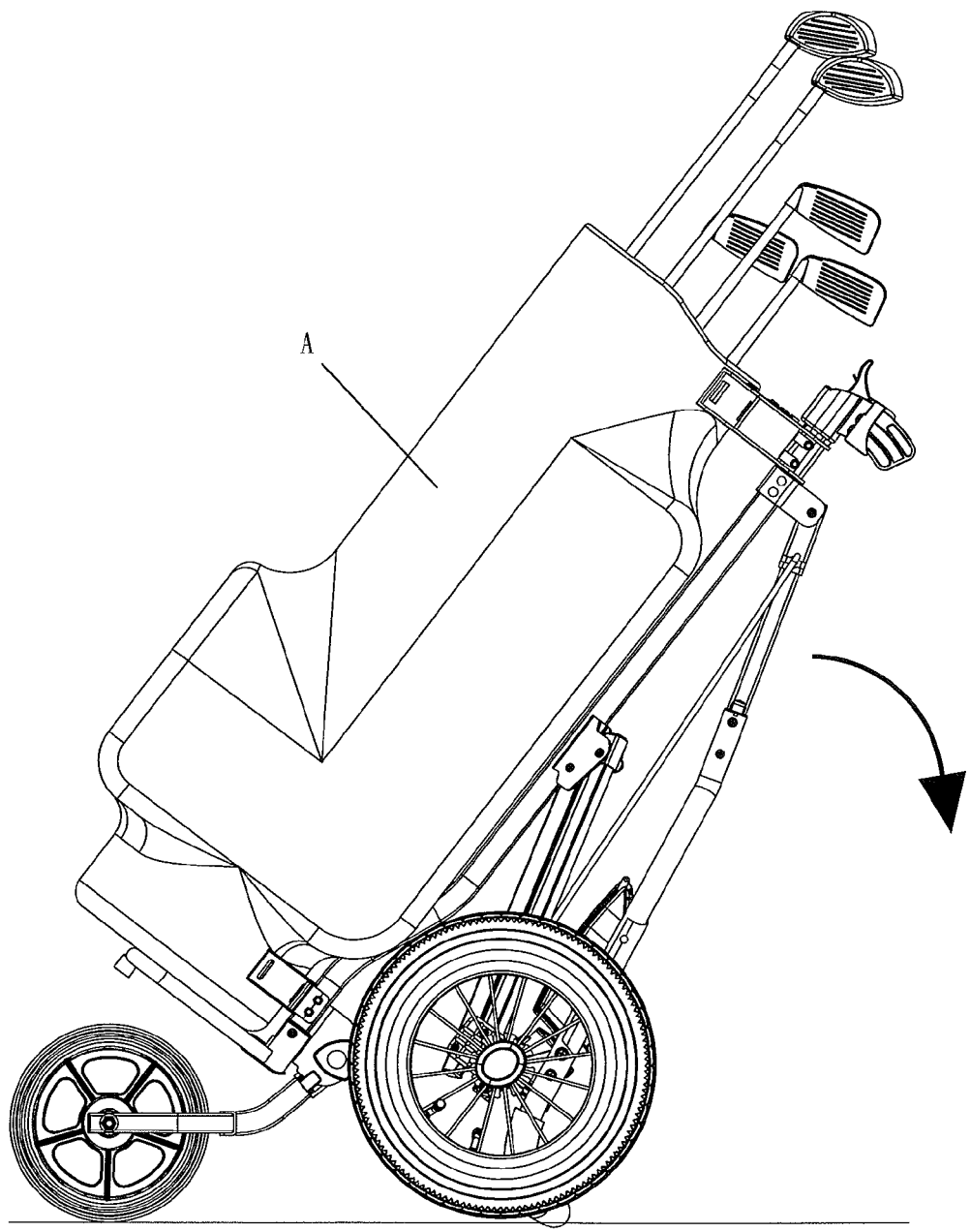
FIG. 2 is a side view of the first conventional golf bag cart when the cart is folded.
Figure 3:
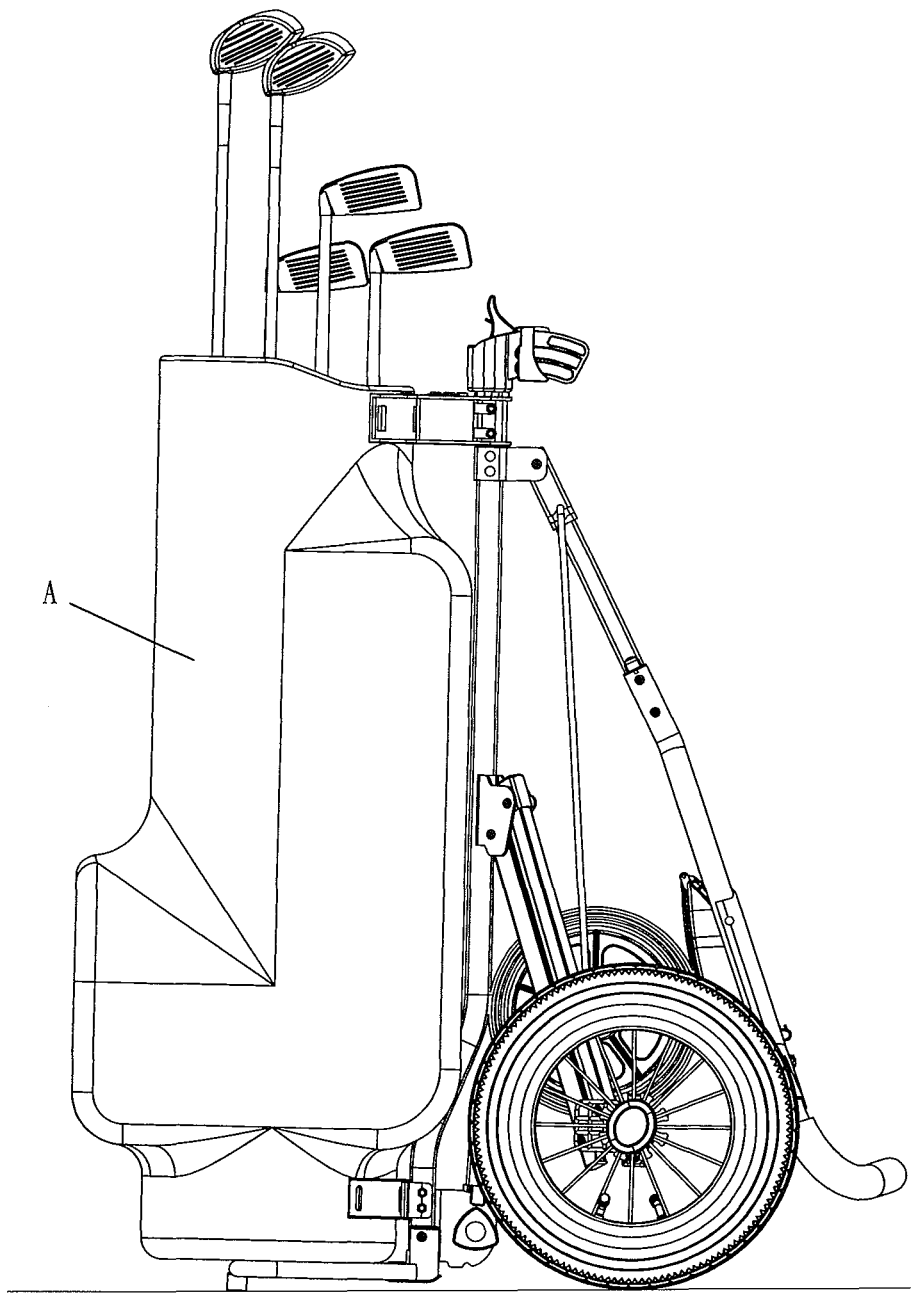
FIG. 3 is another side view of the first conventional golf bag cart when the cart is folded.
Figure 4:
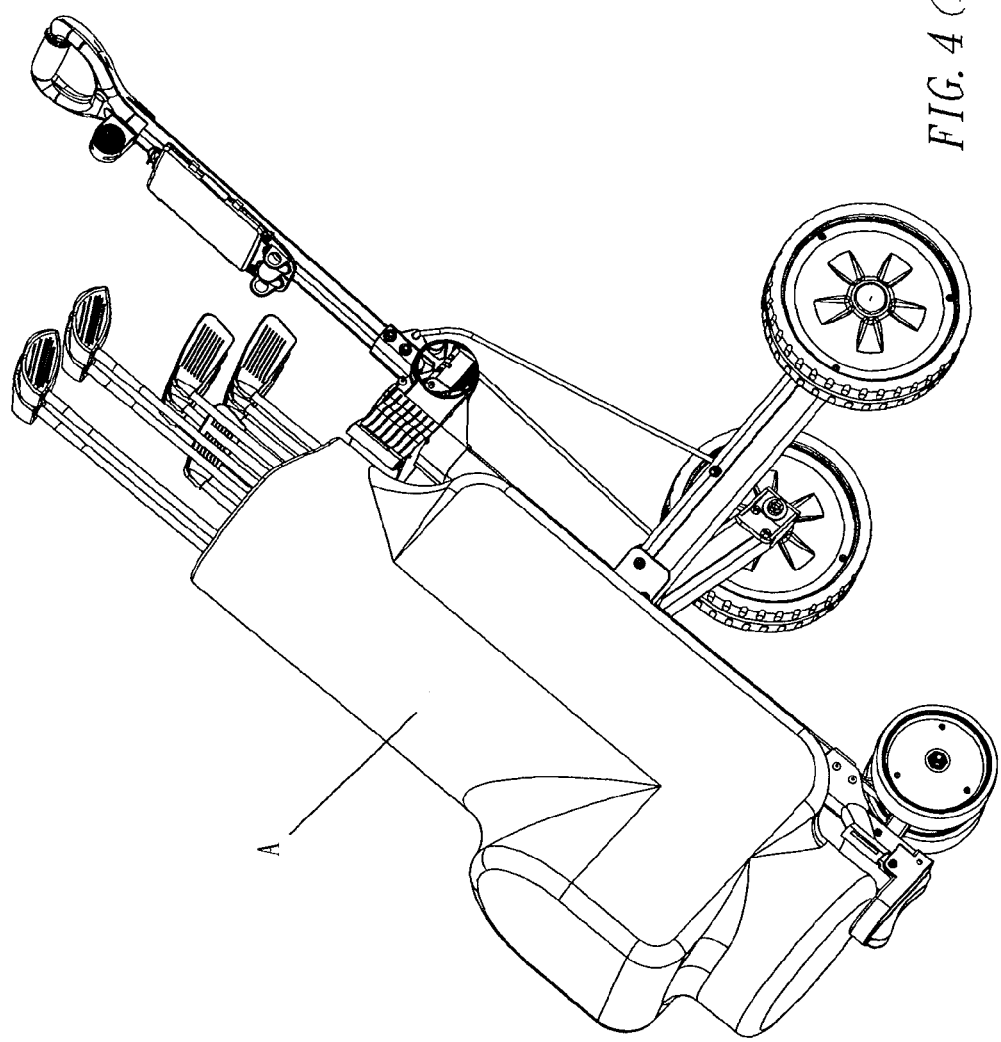
FIG. 4 is a side view of a second conventional golf bag cart when the cart is unfolded.
Figure 5:
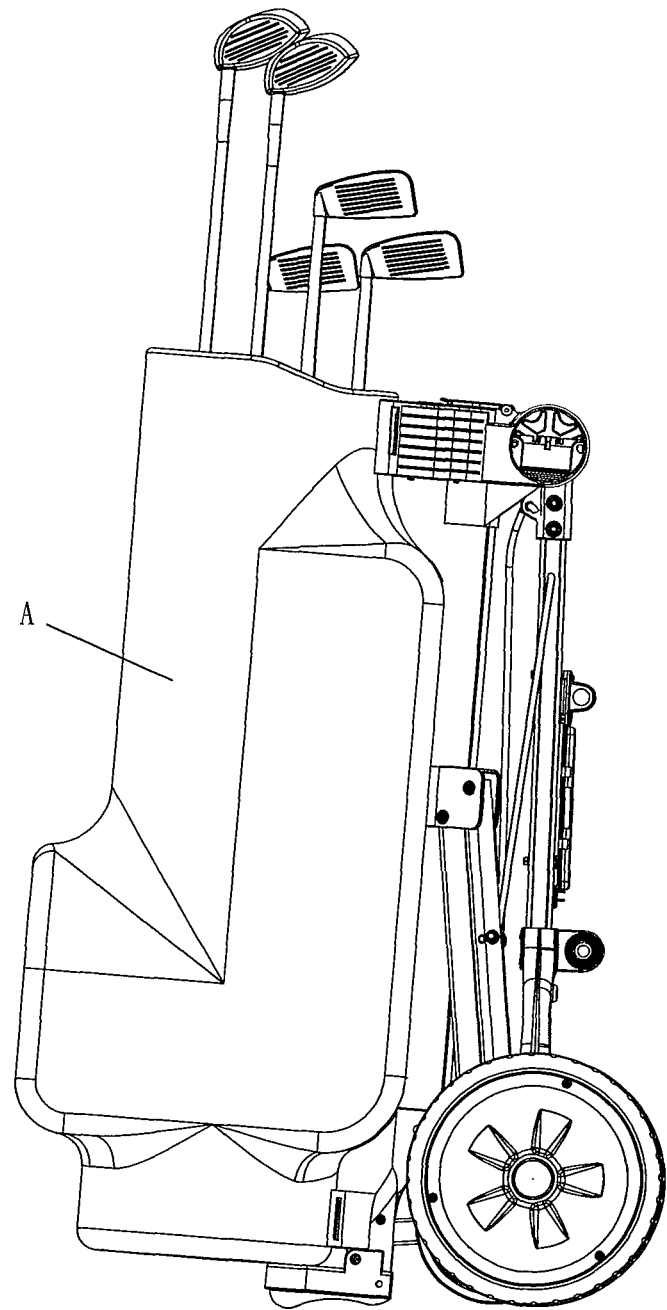
FIG. 5 is another side view of the second conventional golf bag cart when the cart is folded.
Figure 6:
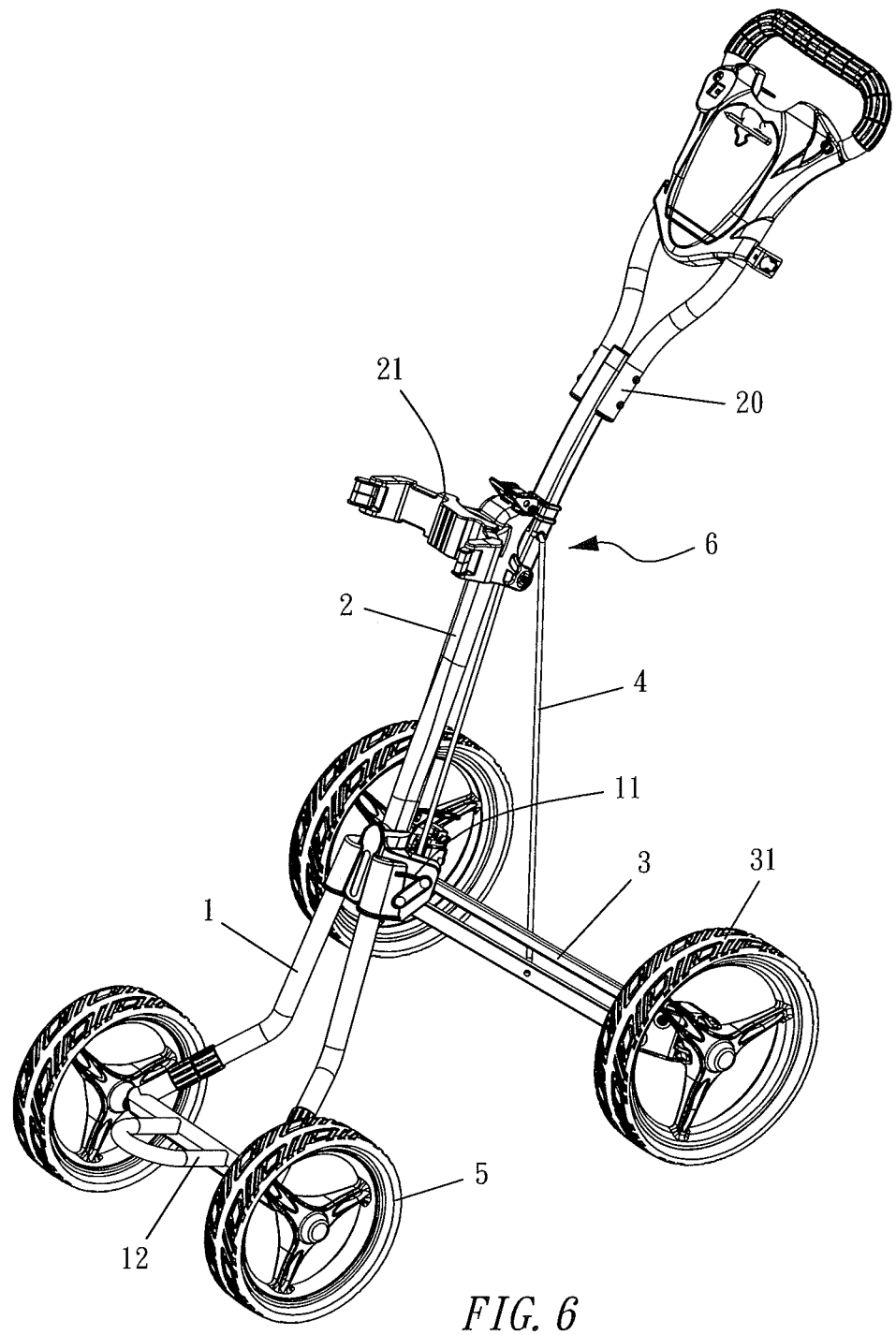
FIG. 6 is a perspective view of a golf bag cart of the present invention when the cart is unfolded.
Figure 7:
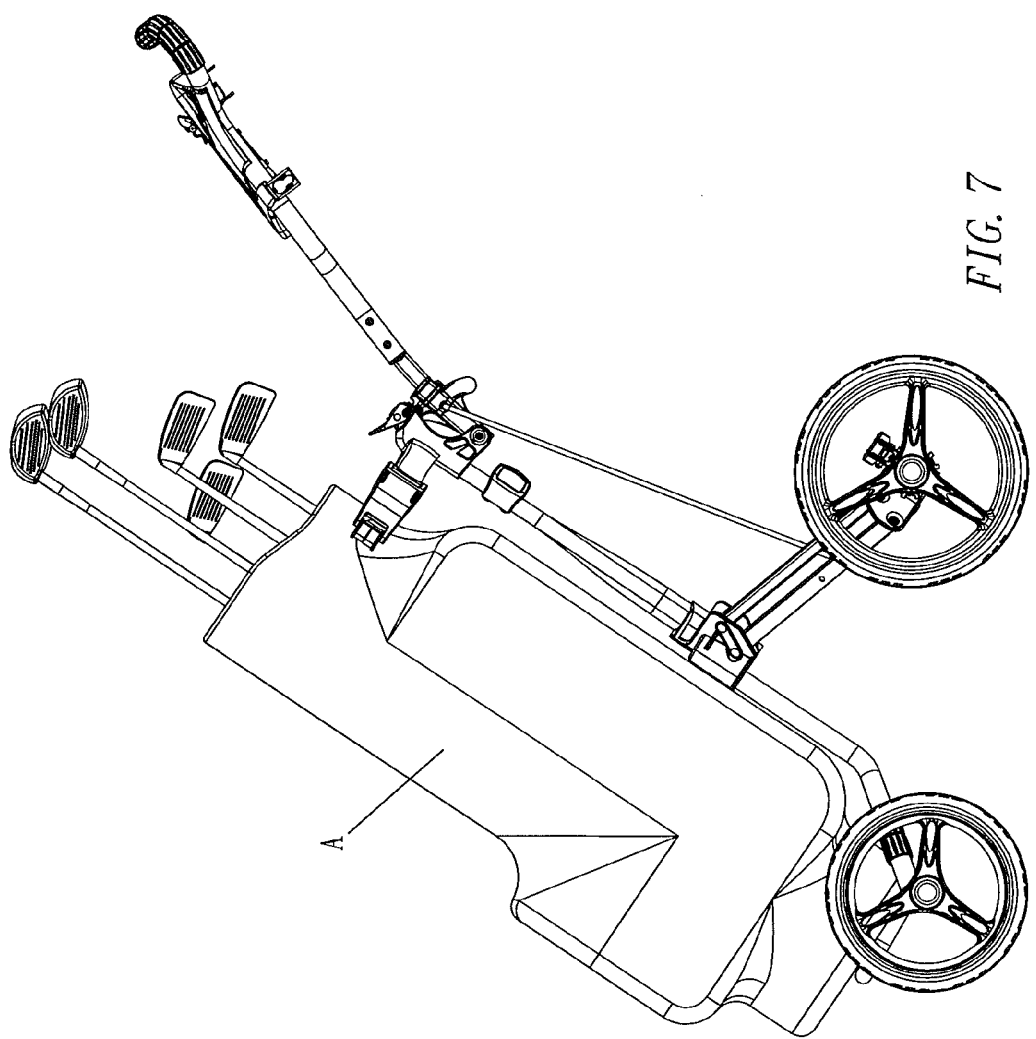
FIG. 7 is a side view of a golf bag cart of the present invention when it is unfolded.
Figure 8:
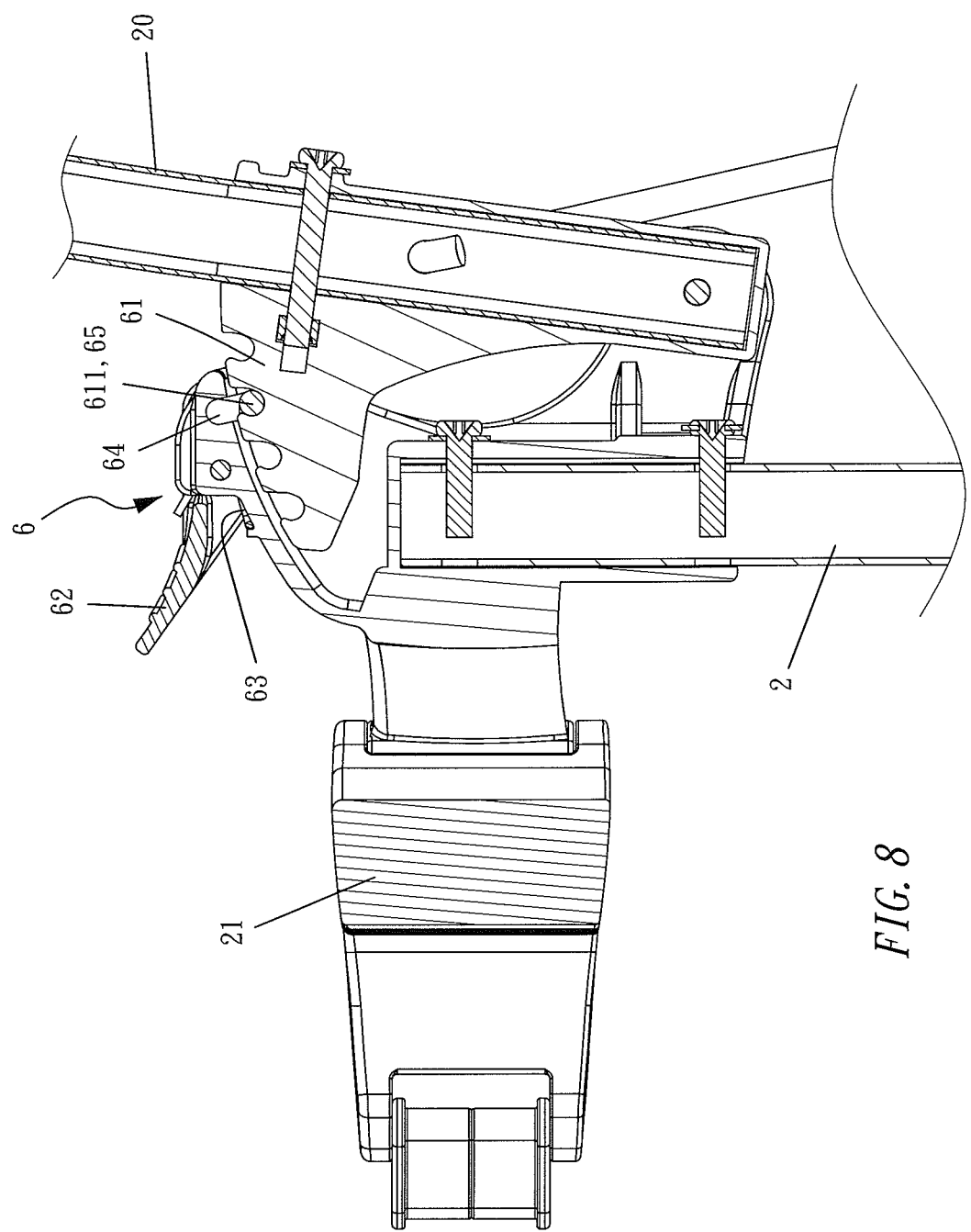
FIG. 8 is a cross-sectional view of a locking mechanism of the present invention when it is unfolded.
Figure 9:
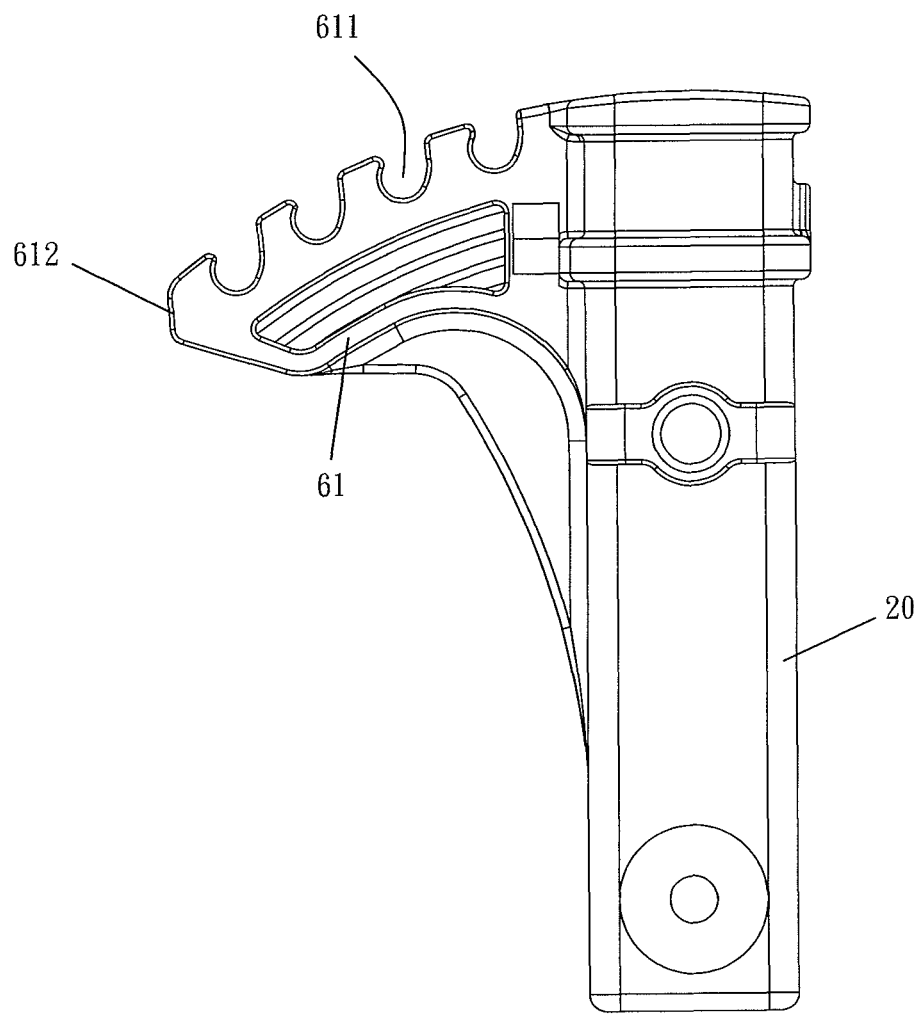
FIG. 9 is a schematic view of a snap seat of a locking mechanism of the present invention.
Figure 10:
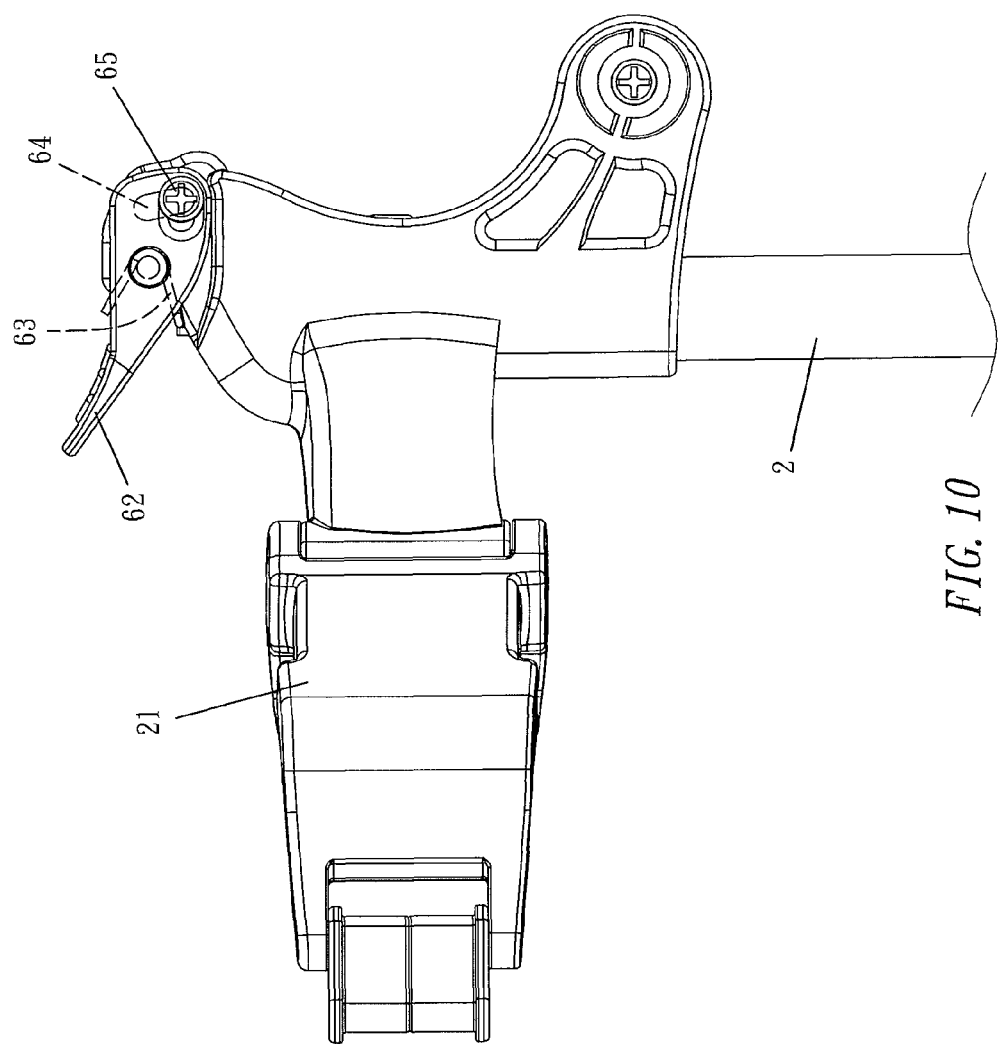
FIG. 10 is a schematic view of a pull buckle of a locking mechanism of the present invention.
Figure 11:
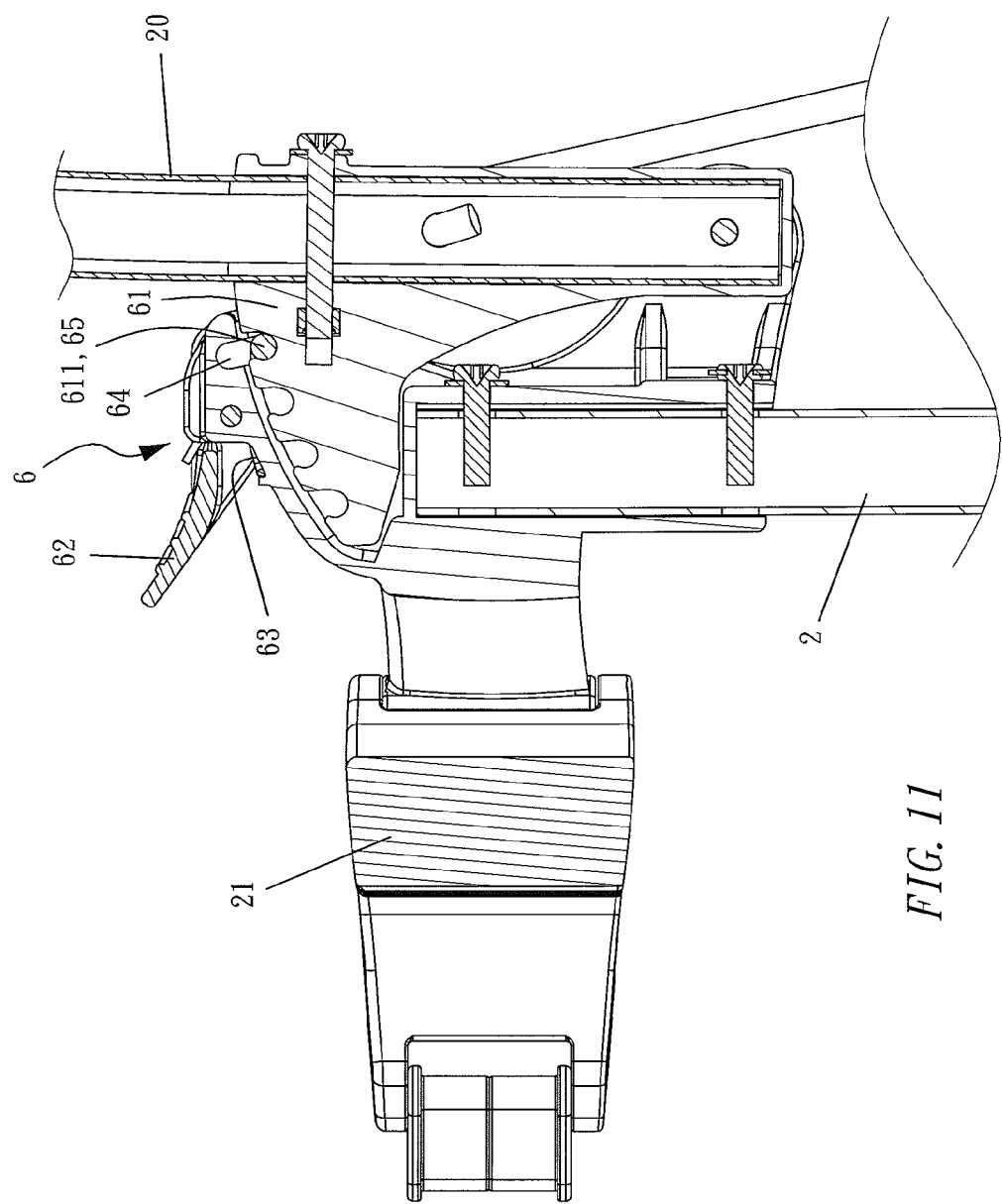
FIG. 11 is a schematic view of adjusting an angle of a handle module when a golf bag cart of the present invention is unfolded.
Figure 12:
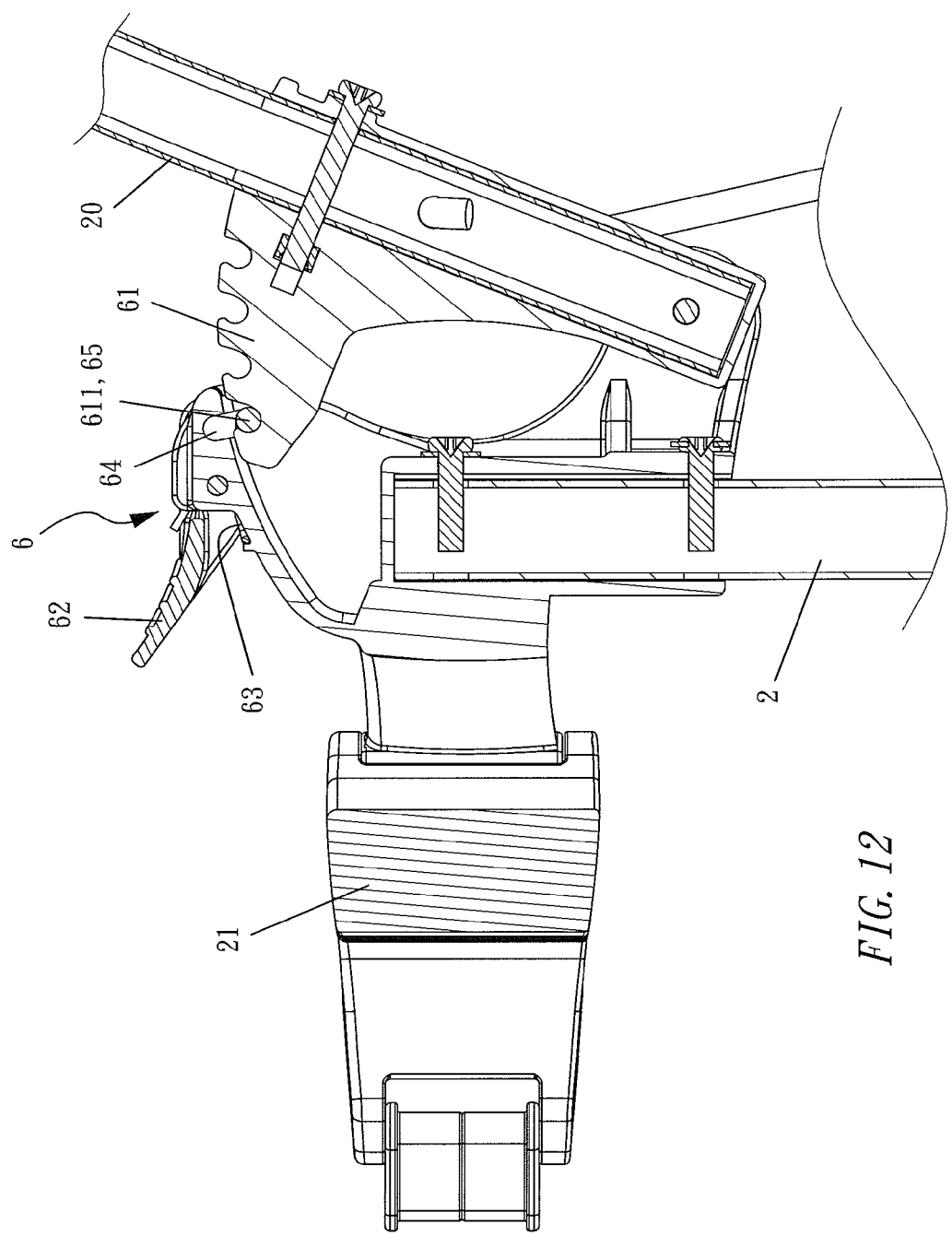
FIG. 12 is another schematic view of adjusting an angle of a handle module when a golf bag cart of the present invention is unfolded.

With the aforementioned structure and assembly, when the present invention is unfolded as shown in FIGS. 6 to 8, the golf bag A is fixed between the upper supporting base 21 and the lower supporting base 12, and the snap rod 65 of the locking mechanism 6 is snapped into the snap slot 611, such that the handle module 20 and the upper cart frame 2 are secured with one another. Now, the pull buckle 62 can be pressed to separate the snap rod 65 from the snap slot 611, while moving the handle module 20 (or the snap seat 61) to change the snapping position of the snap rod 65 and the snap slot 611 to achieve the effect of adjusting the inclination of the handle module 20 as shown in FIGS. 8, 11 and 12 to fit users of different heights.

Figure 13:
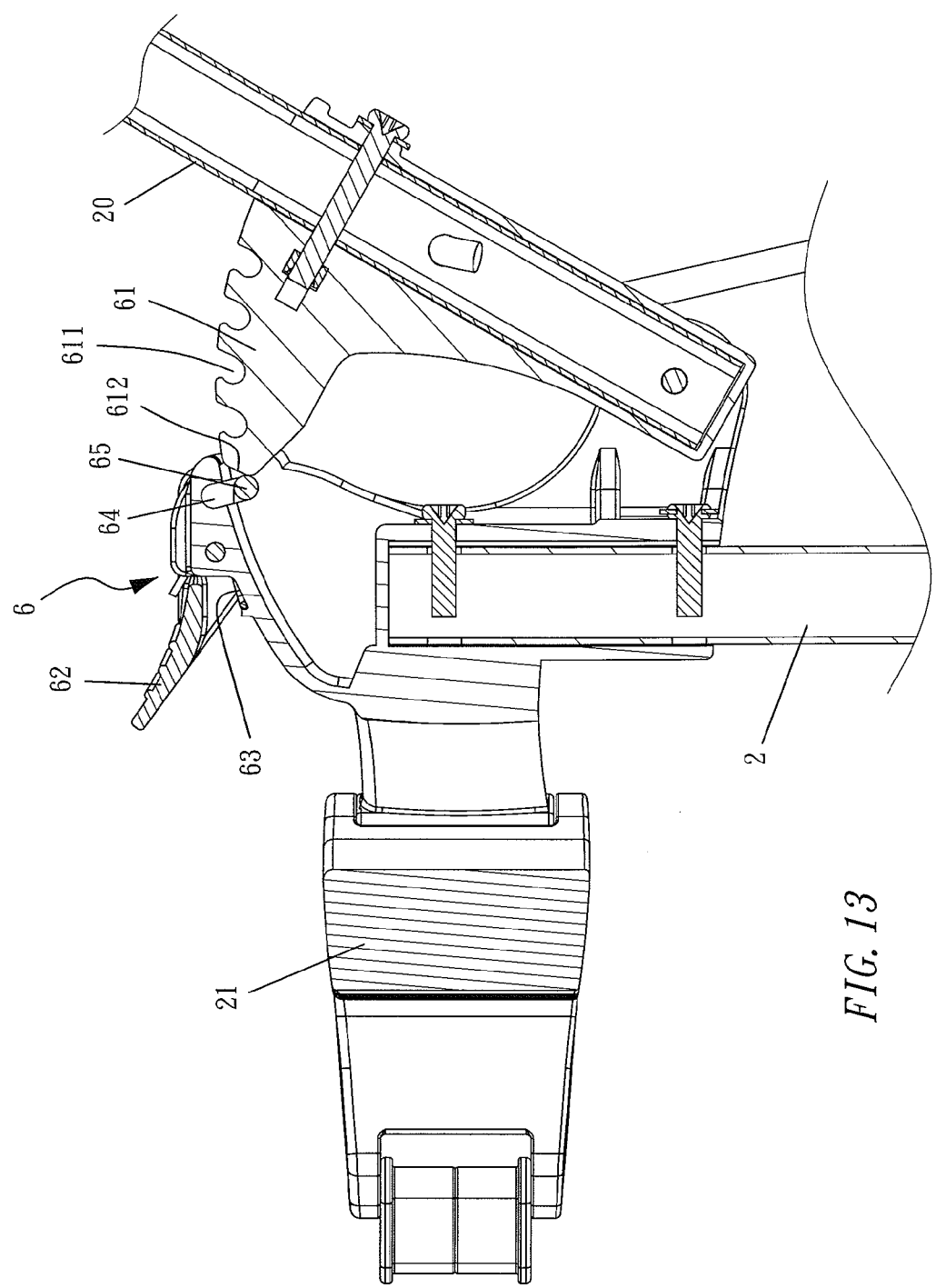
FIG. 13 is a cross-sectional view of a locking mechanism of the present invention locking mechanism when the locking mechanism is released.
Figure 14:
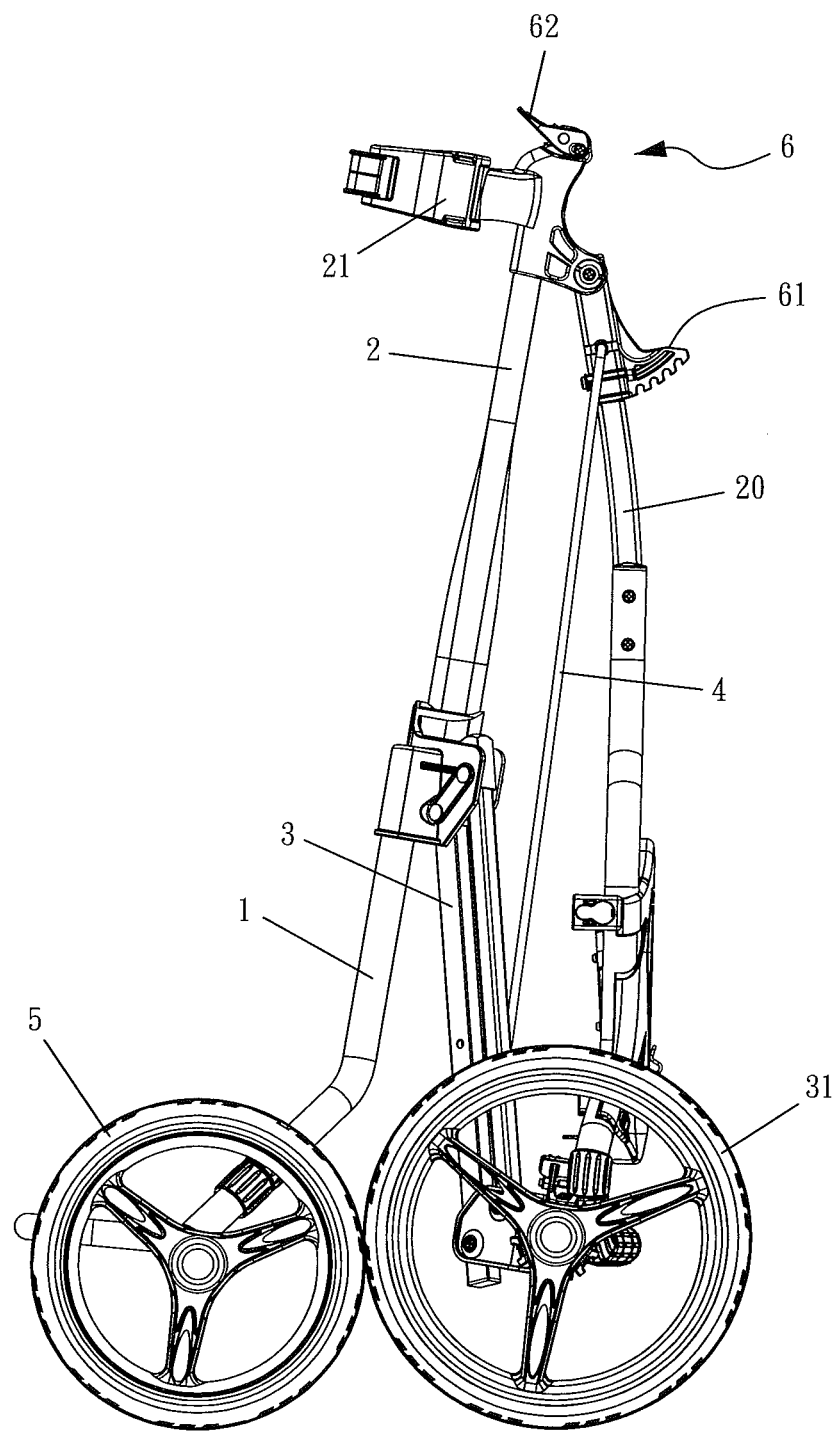
FIG. 14 is a side view of a golf bag cart of the present invention when the cart is folded.
Figure 15:
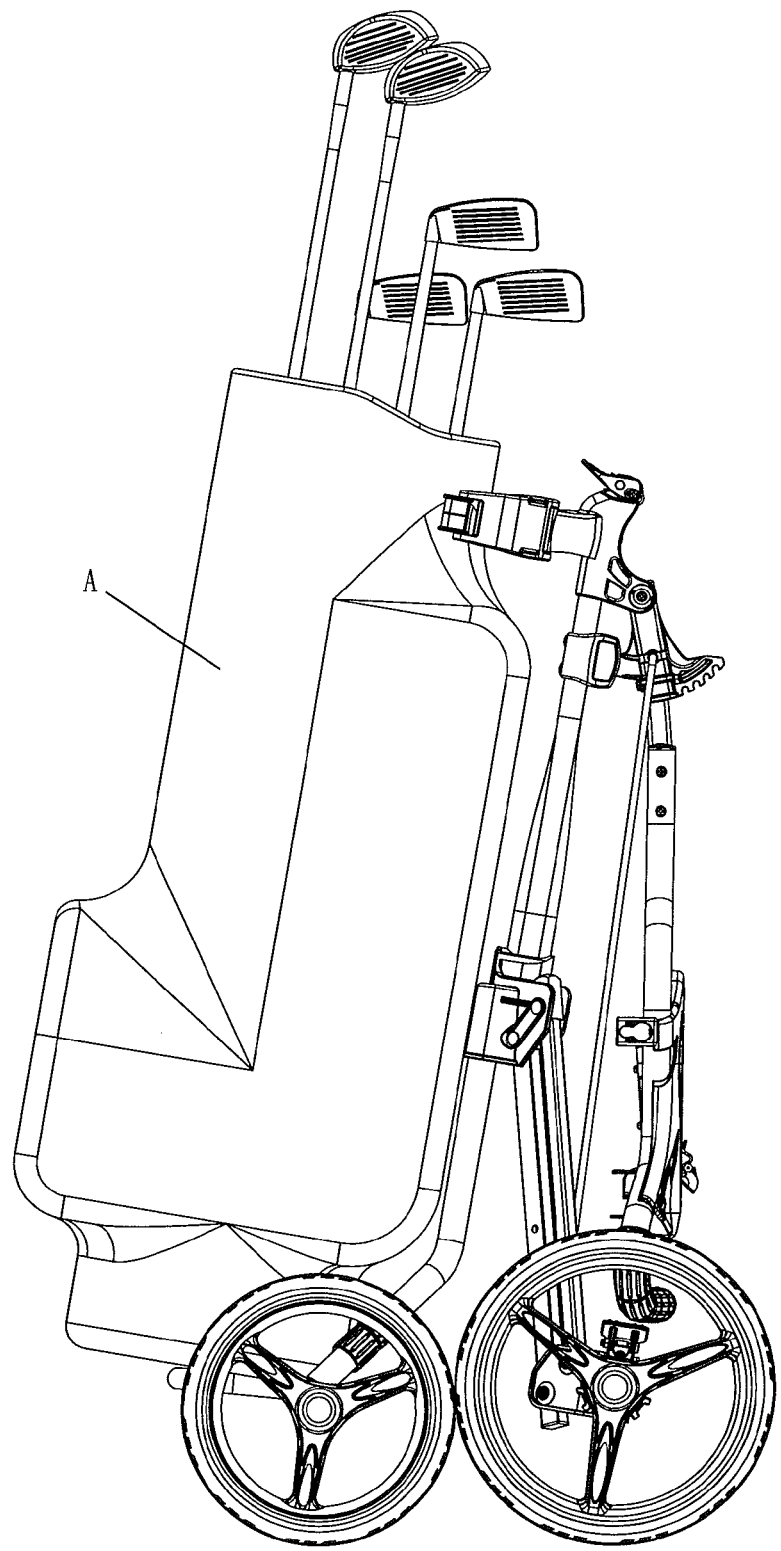
FIG. 15 is another side view of a golf bag cart of the present invention when the cart is folded.

If a user wants to fold the gold bag cart, the user releases the locking mechanism 6, and presses the pull buckle 62 to separate the snap rod 65 from the snap slot 611. Then, the user turns the handle module 20 backward and rotates it downward, so that the pull rod 4 drives the rear wheel stand 3 to move forward and fold inward, and the rear wheels 31 and the front wheels 5 close in with each other to complete folding the golf bag cart as shown in FIGS. 13 to 15 without requiring the step of folding the front wheels 5. Thus, the operation is simple and easy. Users need not remove the golf bag A before folding the golf bag cart, to keep the four wheels (including the two front wheels and the two rear wheels) to stand on the ground simultaneously after the golf bag cart is folded and also to facilitate the users to carry or move the golf bag cart.

In the aforementioned folding and unfolding operations, the handle module 20 is moved backward and folded downward at the same time, the snap hook 81 is snapped into the snap block 80 to be fixed with the push button 82, and the handle module 20 and the upper cart frame 2 are latched and positioned to facilitate carrying or moving the golf bag cart, while preventing the cart from being unfolded accidentally.

On the other hand, if the user wants to unfold the golf bag cart, the user releases the folding and fixing mechanism 8 first by pressing the push button 82 to separate it from the snap hook 81 as shown in FIG. 19. Then, the handle module 20 is moved upward and pulled forward, and the pull rod 4 drives the rear wheel stand 3 to move backward and unfold outward. In the meantime, the locking mechanism 6 automatically locks the handle module 20 with the upper cart frame 2. In other words, when the handle module 20 is moved upward and turned forward, the push-pull surface 612 at the front end of the snap seat 61 pushes the snap rod 65 to move along the long slot 64 as shown FIG. 13, and then the elastic force of elastic element 63 snaps the snap rod 65 into the snap slot 611 to complete an automatic lock and resume the original unfolded state as shown in FIGS. 6 to 8.

In summation of the description above, the present invention improves over the prior art and at least has the following advantages and effects.

1. The folding can be completed by simply turning the handle module 20 downward. The invention can skip the additional step of folding the front wheels again, providing a simple and convenient operation, but also preventing staining the user's body or clothes.
2. The four wheels keep standing on the ground after the golf bag cart is folded, and the golf bag A stays on the cart to facilitate users to carry the cart, or to facilitate users to push the cart with the golf bag remaining in the cart.
3. The folding and fixing mechanism 8 can be used for latching and positioning the upper cart frame 2 and the handle module 20 to facilitate users to carry and move the golf bag cart.
4. When the golf bag cart is unfolded, the locking mechanism 6 is used to adjust the inclination of the handle module 20 to fit users of different heights.

In summation, the invention improves over the prior art.

What is claimed is:

1. A two-fold four-wheel golf bag cart folding device, comprising:
   a golf bag;
   a lower cart frame having a connecting plate installed at an upper end of the lower cart frame and a lower supporting base immovably fixed at a lower end of the lower cart frame, with the lower supporting base defining an axis extending perpendicular to the lower cart frame;
   an upper cart frame having a lower end partially coupled to the connecting plate and having an upper supporting base and a handle module at an upper end, wherein the upper supporting base and the lower supporting base are fixed to the golf bag;

a rear wheel stand mounted on both sides of the connecting plate and having a rear wheel;

a pull rod having an end coupled to the handle module and another end coupled to the rear wheel stand;

a front wheel set having two front wheels installed on both sides of the lower supporting base respectively;

a locking mechanism installed between an upper end of the upper cart frame and a lower end of the handle module, with the locking mechanism fixing an angle between the upper cart frame and the handle module; and a four-link-rod mechanism installed among the handle module, the rear wheel stand and the pull rod, wherein the lower and upper cart frames, the rear wheel stands, and the pull rod is moveable between a folded position and an unfolded position, with the handle module extending at an acute angle relative to the upper cart frame in the folded position and extending at an obtuse angle relative to the upper cart frame in the unfolded position, wherein the front and rear wheels touch the ground simultaneously as the lower and upper cart frames, the pull rod, and the rear wheel stands move between the folded and unfolded positions, and wherein the golf bag is attached onto the upper and lower cart frames and remains erect without being toppled when the upper and lower cart frames, the handle module, and the rear wheel stands move between the folded and unfolded positions.

2. The two-fold four-wheel golf bag cart folding device of claim 1, wherein the four-link-rod mechanism comprises:

a first link rod extending from a first shaft to a second shaft of the handle module;

a second link rod being the pull rod;

a third link rod extending from a third shaft to a fourth shaft of the rear wheel stand; and a fourth link rod extending from the first shaft of the handle module to a fourth shaft of the rear wheel stand.

* * * * *